United States Patent
Ebihara et al.

(10) Patent No.: US 11,906,406 B2
(45) Date of Patent: Feb. 20, 2024

(54) AUTOMATIC ANALYZER AND ANALYSIS METHOD

(71) Applicants: Hitachi High-Tech Corporation, Tokyo (JP); Roche Diagnostics Operations, Inc., Indianapolis, IN (US)

(72) Inventors: Daisuke Ebihara, Tokyo (JP); Shinya Matsuoka, Tokyo (JP); Taku Sakazume, Tokyo (JP); Yuzuru Shimazaki, Tokyo (JP)

(73) Assignees: Hitachi High-Tech Corporation, Tokyo (JP); Roche Diagnostics Operations, Inc., Indianapolis, IN (US)

( * ) Notice: Subject to any disclaimer, the term of this patent is extended or adjusted under 35 U.S.C. 154(b) by 659 days.

(21) Appl. No.: 16/618,630

(22) PCT Filed: Apr. 5, 2018

(86) PCT No.: PCT/JP2018/014550
§ 371 (c)(1),
(2) Date: Dec. 2, 2019

(87) PCT Pub. No.: WO2018/221001
PCT Pub. Date: Dec. 6, 2018

(65) Prior Publication Data
US 2020/0182754 A1   Jun. 11, 2020

(30) Foreign Application Priority Data

Jun. 2, 2017 (JP) .................................. 2017-110454

(51) Int. Cl.
*G01N 35/02* (2006.01)
*G01N 1/38* (2006.01)
(Continued)

(52) U.S. Cl.
CPC ............. *G01N 1/38* (2013.01); *G01N 35/025* (2013.01); *G01N 35/04* (2013.01);
(Continued)

(58) Field of Classification Search
CPC ........ G01N 1/38; G01N 35/025; G01N 35/04; G01N 2035/00514; G01N 2035/00524;
(Continued)

(56) References Cited

U.S. PATENT DOCUMENTS

| 5,736,100 A | 4/1998 | Miyake et al. |
| 2011/0020948 A1* | 1/2011 | Yamato ............... G01N 35/1011 422/63 |

(Continued)

FOREIGN PATENT DOCUMENTS

| EP | 2 278 336 A2 | 1/2011 |
| JP | 63-148166 A | 6/1988 |

(Continued)

OTHER PUBLICATIONS

Extended European Search Report issued in European Application No. 18810005.1 dated Mar. 18, 2021 (seven (7) pages).
(Continued)

*Primary Examiner* — Benjamin R Whatley
(74) *Attorney, Agent, or Firm* — Crowell & Moring LLP (57) ABSTRACT

Provided is an automatic analysis technique that prevents liquid contained in a reaction container from locally contacting with liquid added afterward and has less occurrence frequency of equipment malfunction and high performance. An automatic analyzer (1) includes: a reaction container disk (120) that holds a reaction container (116); a stirring mechanism (124) that stirs liquid contained in the reaction container (116) in a non-contact manner; a carrying mechanism (125) that carries the reaction container (116) between the reaction container disk (120) and the stirring mechanism
(Continued)

(124); a reagent disk (122) that holds a reagent container (121); and a reagent dispensing mechanism (123) that suctions and discharges a reagent contained in the reagent container (121), the stirring mechanism (124) is provided at a position where the reagent dispensing mechanism (123) discharges the reagent, and the reagent dispensing mechanism (123) discharges the reagent, which is sucked from the reagent container (121), to the reaction container (116) installed in the stirring mechanism (124).

7 Claims, 5 Drawing Sheets (51) Int. Cl.
    *G01N 35/04*     (2006.01)
    *G01N 35/00*     (2006.01)
(52) U.S. Cl.
    CPC ........... *G01N 2035/00514* (2013.01); *G01N 2035/00524* (2013.01); *G01N 2035/00534* (2013.01); *G01N 2035/00554* (2013.01); *G01N 2035/0443* (2013.01); *G01N 2035/0444* (2013.01)
(58) Field of Classification Search
    CPC ......... G01N 2035/00534; G01N 2035/00554; G01N 2035/0443; G01N 2035/0444
    See application file for complete search history.

(56) References Cited

U.S. PATENT DOCUMENTS

| | | | |
|---|---|---|---|
| 2011/0020949 A1 | 1/2011 | Sugiyama et al. | |
| 2012/0087830 A1* | 4/2012 | Wakamiya | G01N 35/0092 422/67 |
| 2012/0149127 A1* | 6/2012 | Toyoshima | G01N 35/0098 422/67 |
| 2016/0299164 A1* | 10/2016 | Ackermann | G01N 35/00693 |
| 2017/0052191 A1* | 2/2017 | Basheer | G01N 1/44 |
| 2019/0336891 A1* | 11/2019 | Lopez | B01D 29/055 |

FOREIGN PATENT DOCUMENTS

| | | |
|---|---|---|
| JP | 2004-245768 A | 9/2004 |
| JP | 2009-270941 A | 11/2009 |
| JP | 2013-88164 A | 5/2013 |
| JP | 2013-246090 A | 12/2013 |
| WO | WO 2016/136377 A1 | 9/2016 |

OTHER PUBLICATIONS

International Search Report (PCT/ISA/210) issued in PCT Application No. PCT/JP2018/014550 dated Jul. 3, 2018 with English translation (five pages).
Japanese-language Written Opinion (PCT/ISA/237) issued in PCT Application No. PCT/JP2018/014550 dated Jul. 3, 2018 (five pages).

* cited by examiner

ND ANALYSIS
AUTOMATIC ANALYZER AND ANALYSIS METHOD

TECHNICAL FIELD

The present disclosure relates to an automatic analyzer that analyzes a biological sample and an analysis method.

BACKGROUND ART

The automatic analyzer rapidly and efficiently contributes to a clinical examination by automating a part of the procedure of a sample examination. A general automatic analyzer includes: a dispensing mechanism for dispensing a predetermined amount of a solution such as a sample or a reagent to a reaction container; and a stirring mechanism that stirs the sample, the reagent, or the like in the reaction container.

In the related art, when an automatic analyzer discharges and stirs a plurality of solutions in a reaction container, one solution is discharged to the reaction container in advance, a total amount of another different solution is added afterward to the reaction container containing the solution by a single discharging operation, and then the solutions are stirred. For example, the automatic analyzer discharges a sample to a reaction container first and then discharges a total amount of a reagent to the reaction container containing the sample at a time.

Here, the reagent discharged from the dispensing mechanism is added to the reaction container in the form of liquid droplets. Therefore, immediately after the reagent is discharged, the sample previously contained in the reaction container and the reagent added afterward are not uniformly mixed with each other, and the two solutions are in contact with each other in a state where the concentration of the reagent added afterward is high. Thus, a state where the concentration ratio deviates from a concentration ratio of a chemical reaction that is originally set is locally formed in the mixed solution.

In general, in the chemical reaction, when the mixing ratio between the solutions deviates from the original set value, a harmful effect may occur. Therefore, when a plurality of solutions are mixed with each other, the concentration ratio is strictly controlled. For example, in a chemical reaction in which protein is modified using an organic solvent to separate a measurement target material bonded to the protein, when the organic solvent with a high concentration is locally in contact with liquid such as serum previously contained in the reaction container, a modification reaction of the protein occurs more than expected at the contact portion such that a large amount of insoluble matter may be produced.

The insoluble matter has a harmful effect on automation of the process in the automatic analyzer, which affects the analysis result. The produced insoluble matter may bring equipment malfunction. Therefore, a reduction in the amount of the insoluble matter produced is effective from the viewpoints of securing the analysis performance of equipment and preventing malfunction.

In order to prevent a solution to be added from contacting another solution with a high concentration, it is desirable to form a flow in a solution contained in a reaction container and to discharge another solution thereto such that the solution added afterward is rapidly diffused.

As a technique of forming a flow in a solution during dispensing, PTL 1 discloses an equipment "that provides a stirring blade in a nozzle for dispensing a reagent". As a result, the equipment can stir a reagent simultaneously during dispensing, and the above-described object can be achieved.

CITATION LIST

Patent Literature

PTL 1: JP-A-1988-148166

SUMMARY OF INVENTION

Technical Problem

However, in a case where the nozzle for dispensing a reagent described in PTL 1 in which the stirring blade is provided is used, when a reagent is discharged to a reaction container while stirring a solution, the discharged reagent is taken out by the stirring blade such that the dispensing accuracy may deteriorate. It is necessary that the reaction container is large enough to accommodate the stirring blade, and thus, the size of the reaction container is limited. Due to direct contact between the stirring blade and the solution in the reaction container, a harmful effect such as contamination caused by protein that is modified to be insoluble or peeling of water-repellent coating of the stirring blade caused by contact with an organic solvent may occur.

Due to the above-described reason, it is desirable to perform the stirring of a solution in a non-contact manner while forming a flow in the solution during discharge.

An object of the present disclosure is to provide an automatic analysis technique that prevents liquid contained in a reaction container from locally contacting with liquid added afterward with a high concentration and has less occurrence frequency of equipment malfunction and high performance.

Solution to Problem

In order to achieve the object, one representative automatic analyzer according to the present disclosure includes: a reaction container disk that holds a reaction container; a stirring mechanism that stirs liquid contained in the reaction container in a non-contact manner; a carrying mechanism that carries the reaction container between the reaction container disk and the stirring mechanism; a reagent disk that holds a reagent container; and a reagent dispensing mechanism that suctions and discharges a reagent contained in the reagent container, in which the stirring mechanism is provided at a position where the reagent dispensing mechanism discharges the reagent, and the reagent dispensing mechanism discharges the reagent, which is sucked from the reagent container, to the reaction container installed in the stirring mechanism.

One representative analysis method according to the present disclosure includes: a step in which a carrying mechanism carries a reaction container containing a sample from a reaction container disk to a non-contact type stirring mechanism and installs the reaction container in the stirring mechanism; a step in which the stirring mechanism starts to stir the sample contained in the reaction container; a step in which a reagent dispensing mechanism discharges a reagent to the reaction container after the stirring mechanism starts the stirring; and a step in which the carrying mechanism returns the reaction container, to which the reagent is discharged, from the stirring mechanism to the reaction container disk.

Advantageous Effects of Invention

The present disclosure can provide an automatic analysis technique that has less occurrence frequency of equipment malfunction and high performance by removing the amount of insoluble matter produced in a reaction container. Objects, configurations, and effects other than those described above will be clarified by describing the following embodiment.

DESCRIPTION OF EMBODIMENTS

Hereinafter, an embodiment of the present disclosure will be described in detail. A main target of the embodiment of the present disclosure is an immunoassay analyzer. However, the present disclosure is applicable to general automatic analyzers. For example, the present disclosure is also applicable to a biochemical automatic analyzer, a gene analyzer, a mass spectrometer, or a bacteria tester.

When a liquid separated due to a difference in specific gravity or a liquid including a solid such as magnetic particles is a target, the embodiment of the present disclosure exhibits the effect. However, the embodiment is applicable to general liquids used when a user performs analysis using an automatic analyzer.

Figure 1:
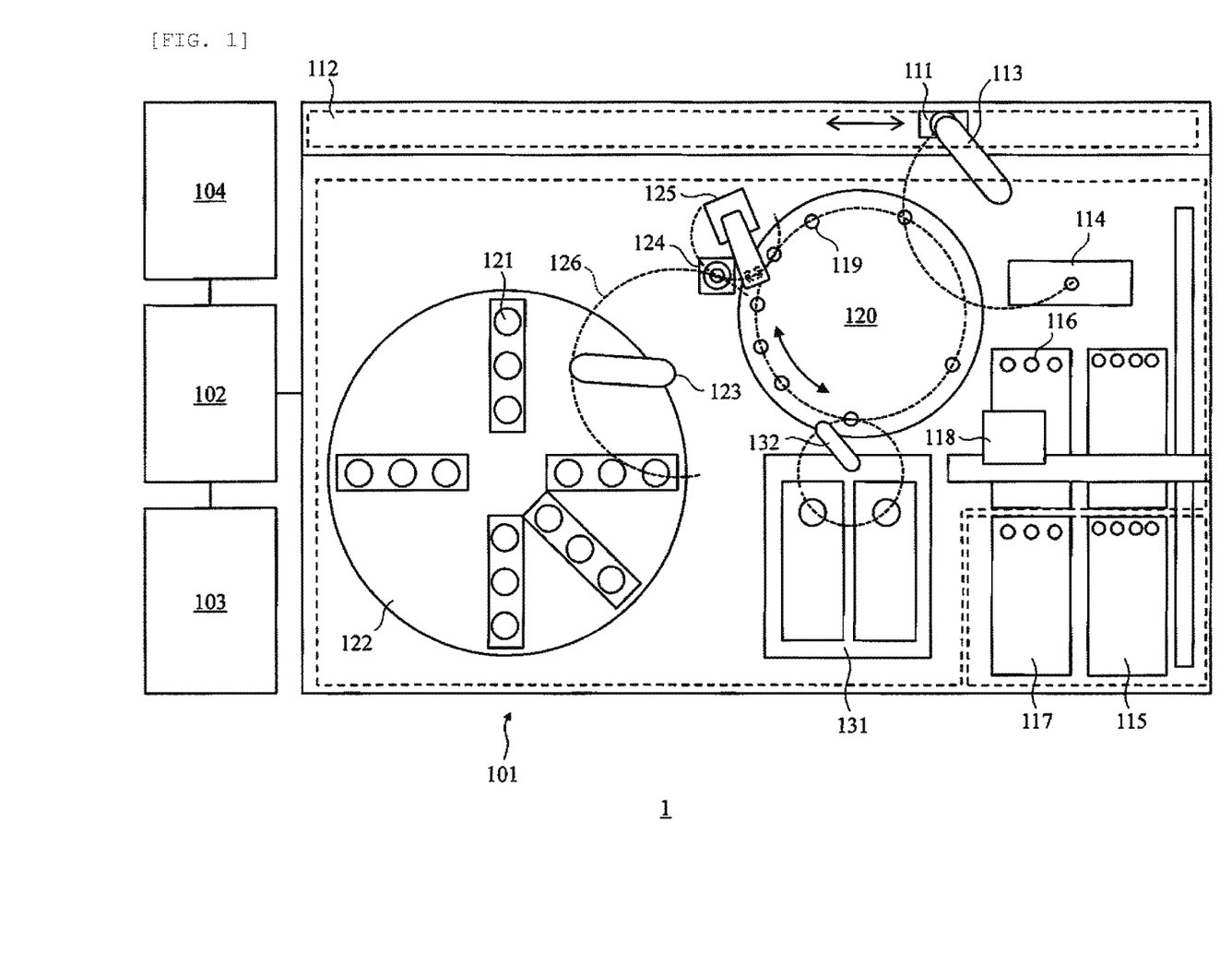
FIG. 1 is a schematic diagram of an automatic analyzer according to an embodiment.

FIG. 1 is a schematic diagram illustrating an automatic analyzer 1 according to the embodiment. The automatic analyzer 1 includes: an analysis unit 101 for performing an analysis operation; a controller 102 for controlling an overall operation of the equipment; an input unit 103 for allowing a user to input information to the equipment; and a display unit 104 for display information to the user. The input unit 103 and the display unit 104 may be the same as each other, and examples thereof include a touch panel type monitor.

The analysis unit 101 of the automatic analyzer 1 includes: a carrying mechanism 112 for carrying a sample container 111 containing a sample to a sample splitting position; a sample dispensing mechanism 113 for discharging the sample; a dispensing chip attaching/detaching unit 114 for attaching or detaching a dispensable dispensing chip for the sample dispensing mechanism 113 to or from the sample dispensing mechanism 113; a dispensing chip mounting rack 115 on which the dispensing chip is mounted; a reaction container mounting rack 117 on which a reaction container 116 is mounted; a carrying mechanism 118 for carrying the dispensing chip and the reaction container 116; a reaction container disk 120 that can keep liquid in the reaction container 116 at a constant temperature and includes a plurality of openings 119; a reagent disk 122 for holding a reagent container 121 containing a measurement reagent; a reagent dispensing mechanism 123 that discharges the measurement reagent to the reaction container 116; a stirring mechanism 124 that stirs the liquid contained in the reaction container 116 in a non-contact manner; a carrying mechanism 125 that carries the reaction container 116 between the reaction container disk 120 and the stirring mechanism 124; a detector 131 that detects a component in blood; and a dispensing mechanism for detector 132 for discharging the liquid in the reaction container 116 to the detector 131.

Hereinafter, the summary of an analysis step of the automatic analyzer 1 will be described with reference to FIG. 1. Before analysis, the automatic analyzer 1 carries the reaction container 116 from the reaction container mounting rack 117 and installs the reaction container 116 in the opening 119 of the reaction container disk 120.

Before splitting the sample, the sample dispensing mechanism 113 accesses the dispensing chip attaching/detaching unit 114 and attaches the dispensing chip to a tip thereof. The sample dispensing mechanism 113 suctions the sample from the sample container 111 through the dispensing chip and discharges the sample to the reaction container 116 on the reaction container disk 120. When the dispensing of the sample from one sample container 111 ends, the sample dispensing mechanism 113 disposes the dispensing chip to the dispensing chip attaching/detaching unit 114. The reaction container 116 to which the sample is dispensed is carried to the stirring mechanism 124 by the carrying mechanism 125.

The reagent dispensing mechanism 123 suctions the measurement reagent from the reagent container 121 on the reagent disk 122 and discharges the measurement reagent to the reaction container 116. For example, the reagent dispensing mechanism 123 starts to discharge the liquid after the stirring mechanism 124 starts to stir the liquid contained in the reaction container 116. The reagent dispensing mechanism 123 may operate together with the stirring mechanism 124 or may operate while the stirring mechanism 124 is stopped. The mixed solution of the sample and the reagent contained in the reaction container 116 is stirred by the stirring mechanism 124 such that a flow is formed.

The stirring mechanism 124 is provided at a position where the reagent dispensing mechanism 123 discharges the reagent. Alternatively, the stirring mechanism 124 supports the reaction container 116 when the reagent dispensing mechanism 123 discharges the reagent. For example, the stirring mechanism 124 stirs the liquid contained in the reaction container 116 before the reagent dispensing mechanism 123 completely discharges a predetermined amount of the reagent to the reaction container 116. As a result, insoluble matter is not likely to be produced as compared to a case where the stirring of the solution starts after the reagent dispensing mechanism 123 completely discharges a large amount of the reagent. "A predetermined amount of the reagent" refers to a partial amount of the reagent in the reagent that is suctioned from the reagent container 121 by the reagent dispensing mechanism 123.

Examples of a non-contact stirring mechanism 124 include a mechanism that allows a rotation operation including a combination of revolution and rotation to act on the reaction container 116, that is, a mechanism that performs eccentric stirring and a mechanism that emits ultrasonic waves from a piezoelectric element to a side surface of the reaction container 116 to form a rotational flow of the liquid in the reaction container 116. When the non-contact stirring mechanism 124 is used, the sample or the reagent is not taken out by a stirring blade. Therefore, the accuracy of the analysis is improved.

After completion of the discharge of the sample by the reagent dispensing mechanism 123 and the stirring by the stirring mechanism 124, the reaction container 116 is installed again in the opening 119 of the reaction container disk 120 by the carrying mechanism 125. For example, the reaction container disk 120 functions as an incubator and incubates the reaction container 116 installed in the opening 119 for a predetermined period of time.

The dispensing mechanism for detector 132 suctions the reaction solution in the reaction container 116 after the incubation and carries the reaction solution to the detector 131. The detector 131 includes means for detecting the light emission amount, for example, a photomultiplier tube, and measures the light emission amount of the reaction solution. Next, the controller 102 calculates a concentration value from light emission data using a calibration curve and displays the calculated analysis result on the display unit 104.

Figure 2:
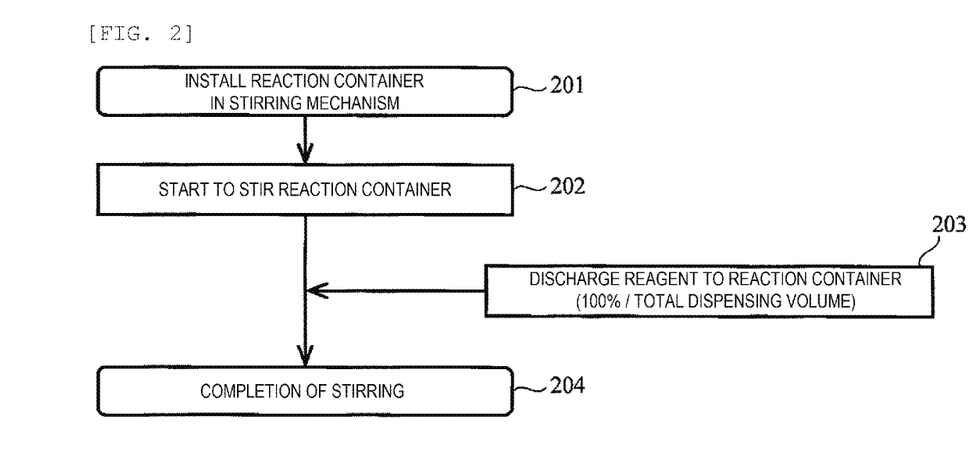
FIG. 2 is a flowchart illustrating an example of an operation process of the automatic analyzer.

FIG. 2 is a flowchart illustrating an example of an operation process of the automatic analyzer 1. The summary of the operation processes of the reagent dispensing mechanism 123 and stirring mechanism 124 as major components of the automatic analyzer 1 will be described with reference to FIGS. 1 and 2. Hereinafter, a case where a mechanism using ultrasonic waves is used as the stirring mechanism 124 will be described.

The reagent dispensing mechanism 123 includes an arm that can rotate and move up and down, and a nozzle is installed in a tip portion of the arm. The reagent dispensing mechanism 123 includes: a syringe that suctions or discharges the solution from or to the nozzle; a flow path that connects the nozzle and the syringe; and a control mechanism that controls the driving of the syringe.

For example, the reagent dispensing mechanism 123 rotates the arm about an axis such that the tip of the arm is moved above the reagent container 121 on the reagent disk 122 provided on a nozzle rotating track 126. Next, the reagent dispensing mechanism 123 lowers a tip portion of the nozzle, dips the tip portion of the nozzle in the reagent in the reagent container 121, and suctions a predetermined amount of the reagent.

On the other hand, the reaction container 116 held in the opening 119 on the reaction container disk 120 is carried by the carrying mechanism 125 to the stirring mechanism 124 provided on the nozzle rotating track 126 (201). The stirring mechanism 124 emits sonic waves to the liquid such as the sample or the reagent contained in the reaction container 116 to form a flow (202).

While the flow is formed in the liquid in the reaction container 116, the reagent dispensing mechanism 123 moves the nozzle above the stirring mechanism 124 and discharges the suctioned reagent to the reaction container 116 (203). After completion of the discharge and the stirring of the reagent, the reaction container 116 is returned to a predetermined opening 119 on the reaction container disk 120 by the carrying mechanism 125 (204).

The reagent dispensing mechanism 123 changes an amount per unit time of the reagent to be discharged, based on a total amount of the reagent discharged to the reaction container 116 or a period of time elapsed from the start of discharge of the reagent to the reaction container 116. As a result, a deviation from the desired compositional ratio of the solution can be prevented.

For example, the reagent dispensing mechanism 123 is set to discharge the reagent such that a relation of $V_A \leq V_B$ is established, where $V_A$ represents an amount per unit time of the liquid to be discharged after $T_A$ seconds from the start of discharge of the reagent, and $V_B$ represents an amount per unit time of the liquid to be discharged after $T_B$ seconds (where $T_A \leq T_B$) from the start of discharge of the reagent.

In a state where the liquid in the reaction container is stirred by the stirring mechanism 124, the reagent dispensing mechanism 123 may continuously discharge the liquid at a set discharge speed. As a result, the reagent to be added by the reagent dispensing mechanism 123 can be prevented from contacting the liquid in the reaction container in a state where the concentration is high.

In the above description, the stirring of the liquid in the reaction container 116 by the stirring mechanism 124 and the discharge of the reagent by the reagent dispensing mechanism 123 are performed simultaneously. However, depending on the kind of the solution to be mixed or the amount of the liquid in the reaction container, it may be difficult to implement the non-contact stirring mechanism 124 using ultrasonic waves. When the non-contact stirring mechanism 124 using ultrasonic waves is used, disassociation of a measurement target material bonded to magnetic particles or an increase in the temperature of the reaction solution may occur.

Here, the reagent dispensing mechanism 123 may intermittently discharge the reagent to the reaction container 116 several times, and the stirring mechanism 124 may stir the liquid while the reagent dispensing mechanism 123 stops discharging the reagent to the reaction container 116. That is, the stirring operation by the stirring mechanism 124 and the discharging operation by the reagent dispensing mechanism 123 may be performed non-simultaneously. Hereinafter, an example of the stirring mechanism 124 that allows a rotation operation including a combination of revolution and rotation to act on the reaction container will be described.

Figure 3:
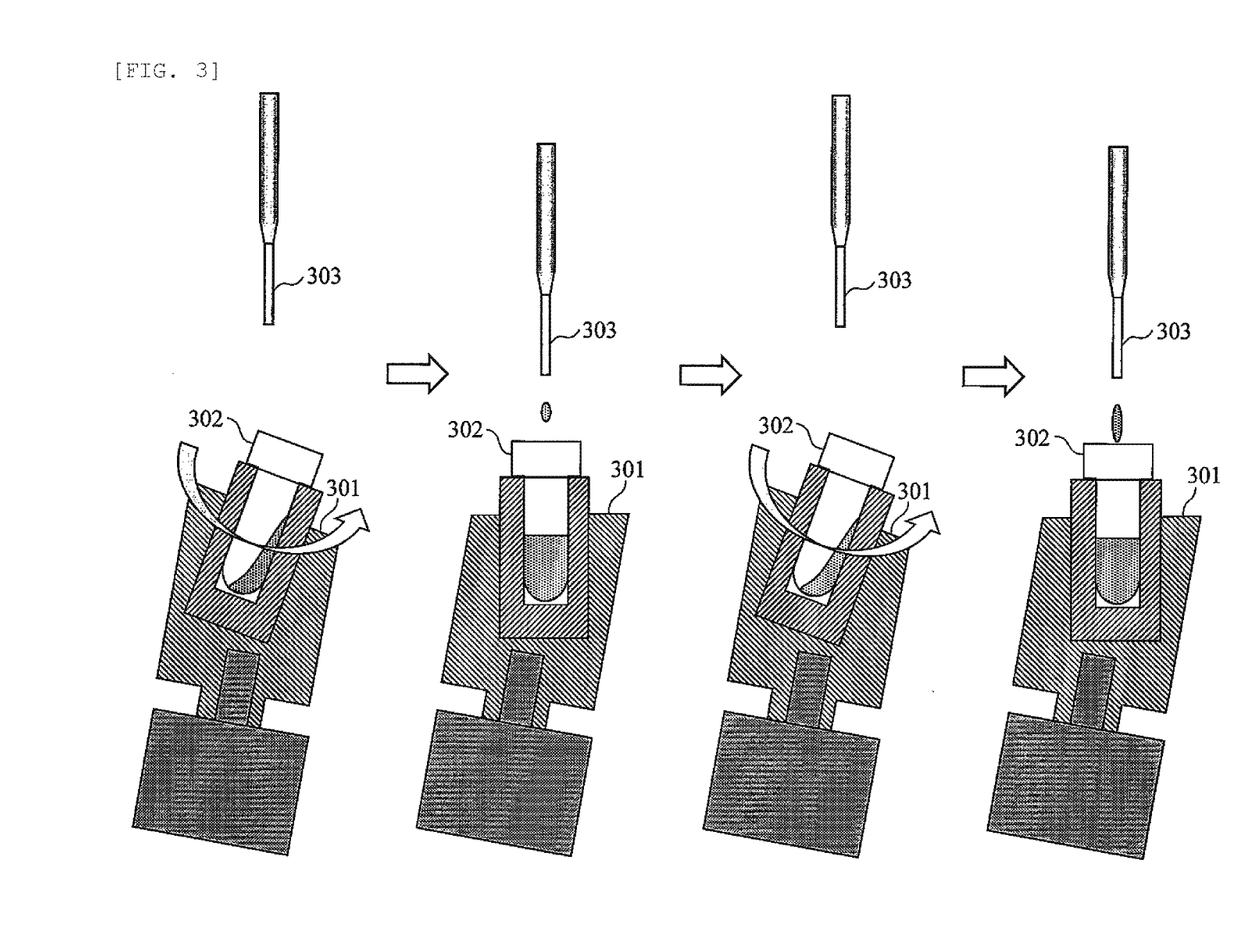
FIG. 3 is a view illustrating operation processes of a reagent dispensing mechanism and a stirring mechanism.

FIG. 3 is a view illustrating operation processes of the reagent dispensing mechanism 123 and the stirring mechanism 301. FIG. 3 schematically illustrates the operation processes in which the stirring mechanism 301 and the reagent dispensing mechanism 123 are alternately operated in order.

Figure 4:
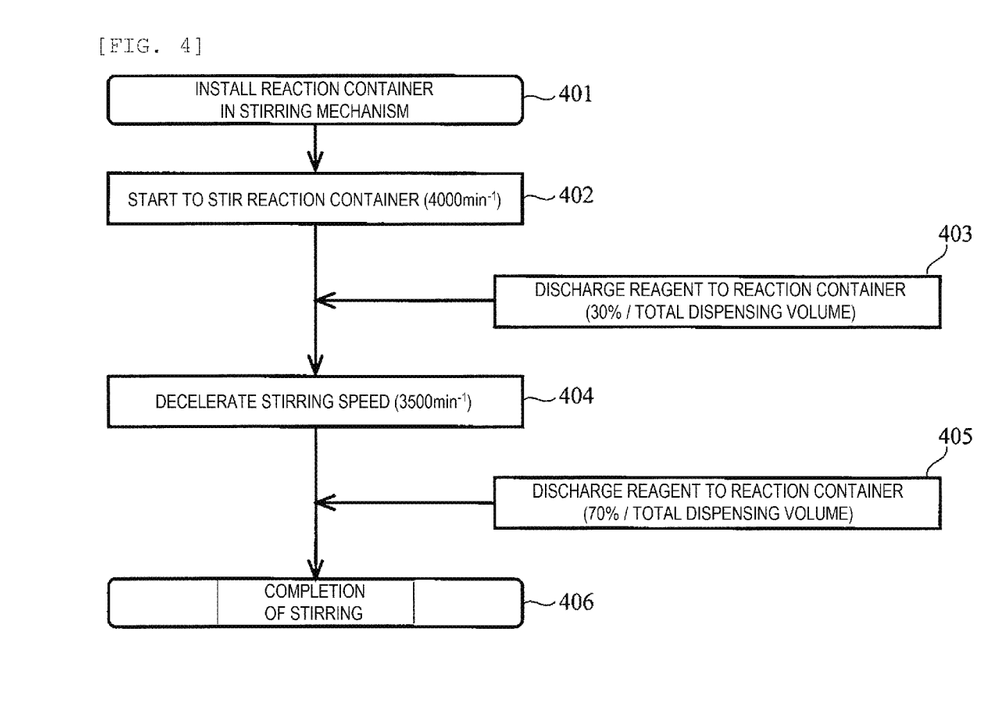
FIG. 4 is a flowchart illustrating the operation processes of the reagent dispensing mechanism and the stirring mechanism.

FIG. 4 is a flowchart illustrating the operation processes of the reagent dispensing mechanism 123 and the stirring mechanism 301.

As illustrated in FIGS. 3 and 4, in the automatic analyzer 1, for example, the reaction container 302 is installed in the stirring mechanism 301 (401), and the liquid in the reaction container 302 is stirred by the stirring mechanism 301 (402). Next, in the automatic analyzer 1, the stirring by the stirring mechanism 301 is stopped, and a part of the suctioned reagent is discharged by the nozzle 303 provided in the reagent dispensing mechanism 123 (403). In the automatic analyzer 1, the stirring by the stirring mechanism 301 is performed again (404), and then a part of the reagent remaining in the nozzle 303 is discharged again (405). The stirring and the discharge described above are repeated until the reagent dispensing mechanism 123 completely discharges the total amount of the suctioned reagent (406).

First, when the reagent dispensing mechanism 123 intermittently discharges the reagent, the discharge amount of the reagent may be variable. As a result, the reagent to be added by the reagent dispensing mechanism 123 can be prevented from contacting the liquid in the reaction container in a state where the concentration is high.

For example, the reagent dispensing mechanism 123 is set to discharge the reagent to the reaction container 302 several times such that a relation of $V_N \leq V_{N+1}$ is established, where $V_N$ represents an amount of the liquid to be discharged at an N-th time and $V_{N+1}$ represents an amount of the liquid to be discharged at an (N+1)-th time. The intermittent stirring by the stirring mechanism 301 and the intermittent discharge by the reagent dispensing mechanism 123 are repeated until the reagent dispensing mechanism 123 completely discharges the total amount of the suctioned reagent. As a result, a deviation from the desired compositional ratio of the solution can be prevented, and insoluble matter is not likely to be produced.

The stirring mechanism 301 may changes a stirring speed based on a total amount of the reagent discharged to the reaction container 302 by the reagent dispensing mechanism 123 or a period of time elapsed from the start of discharge of the reagent to the reaction container 302. Here, in the case of the stirring mechanism that performs eccentric stirring, the stirring speed refers to the revolution speed or the rotation speed of the reaction container 302. In the case of the ultrasonic stirring mechanism, the stirring speed refers to the intensity of ultrasonic waves emitted to the reaction container 302.

For example, the stirring mechanism 301 stirs the liquid contained in the reaction container 302 at a desired stirring speed based on a total amount of the reagent discharged to the reaction container 302 by the reagent dispensing mechanism 123 or a period of time elapsed from the start of discharge of the reagent to the reaction container 302, the desired stirring speed being a standard speed at which the liquid is not scattered from the reaction container 302. The desired stirring speed is, for example, a value determined by experiment. As a result, the reagent discharged by the reagent dispensing mechanism 123 can be sufficiently diffused to the liquid in the reaction container 302.

For example, the stirring mechanism 301 stirs the liquid contained in the reaction container such that a relation of $U_N \geq U_{N+1}$ is established, where $U_N$ represents a stirring speed performed after the reagent dispensing mechanism 123 discharges the reagent to the reaction container 302 N times and $U_{N+1}$ represents a stirring speed performed after the reagent dispensing mechanism 123 discharges the reagent to the reaction container 302 (N+1) times. The intermittent stirring by the stirring mechanism 301 and the intermittent discharge by the reagent dispensing mechanism 123 are repeated until the reagent dispensing mechanism 123 completely discharges the total amount of the suctioned reagent. As a result, even when the amount of the liquid in the reaction container 302 increases, the liquid can be stirred without being scattered to the outside.

Driving conditions of the stirring mechanism 301 and the reagent dispensing mechanism 123 may be preset depending on the kind of the solution to be mixed or the liquid amount ratio. For example, the above-described driving conditions are present depending on the measurement items input by the user through the input unit 103, and the reagent dispensing mechanism 123 and the stirring mechanism 301 are operated under the conditions.

When the reagent dispensing mechanism 123 intermittently discharges the reagent, a part of the reagent may remain in the tip of the nozzle 303. Here, the dispensing performance of the automatic analyzer 1 may be affected. In order to prevent this problem, it is desirable that the reagent dispensing mechanism 123 brings the nozzle 303 into contact with or in close proximity to an inner wall of the reaction container 302 to discharge the reagent.

Figure 5:
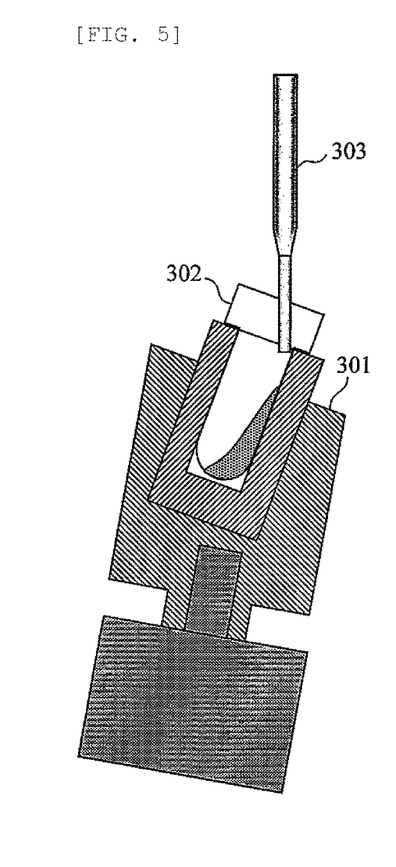
FIG. 5 is a view illustrating a state in which a nozzle is in contact with an inclined reaction container.

FIG. 5 is a view illustrating a state in which the nozzle 303 is in contact with the inclined reaction container 302. Hereinafter, a method of allowing the reagent dispensing mechanism 123 to bring the nozzle 303 into contact with or in close proximity to the inner wall of the reaction container 302 to discharge the reagent will be described with reference to FIG. 5.

When the above-described discharge method is performed, for example, the stirring mechanism 301 stops the stirring of the reaction container 302 at a first position where the opening of the reaction container 302 faces a vertical direction and a second position where an inclination of the reaction container 302 with respect to the vertical direction is larger than that at the first position. In other words, the automatic analyzer 1 is set such that the reaction container 302 is largely inclined with respect to the nozzle 303 at the timing at which the stirring mechanism 301 stops the stirring. The first position is, for example, a position where the carrying mechanism 125 holds the reaction container 302.

For example, the reagent dispensing mechanism 123 is set to bring the nozzle 303 for discharging the reagent into contact with or in close proximity to the inner wall of the reaction container 302 when the reaction container 302 is stopped at the second position. The reagent dispensing mechanism 123 discharges the reagent while bringing a predetermined amount of the reagent in the suctioned reagent into contact with or in close proximity to the inner wall of the reaction container 302 using the nozzle 303. As a result, a problem that a part of the reagent remains in the tip of the nozzle 303 can be prevented.

After discharging the predetermined amount of the reagent, the reagent dispensing mechanism 123 separates the nozzle 303 from the reaction container 302, and the stirring mechanism 301 starts stirring again. The stirring mechanism 301 and the reagent dispensing mechanism 123 repeated the above-described operations until the reagent dispensing mechanism 123 completely discharges the total amount of the suctioned reagent. The operation of bringing the nozzle 303 into contact with the inner wall of the reaction container 302 may be performed every discharging operation of the reagent dispensing mechanism 123 or may be performed at the time of final discharge of the reagent dispensing mechanism 123.

The stirring mechanism 301 may be temperature-controlled. For example, the stirring mechanism 301 is temperature-controlled such that the temperature of the reaction container 302 is 37° C. or higher. As a result, the reaction speed between the liquid in the reaction container 302 and the reagent added afterward by the reagent dispensing mechanism 123 can be controlled. For example, the temperature of the liquid in the reaction container 302 can be controlled by controlling the temperature of the stirring mechanism 301 to be higher than that of the reaction container disk 120 using a temperature control mechanism such as a thermistor and to be a constant temperature.

Effect Exhibited by Automatic Analyzer According to Embodiment

The automatic analyzer 1 according to the embodiment includes: the reaction container disk 120 that holds the reaction container 116; the stirring mechanism 124 that stirs liquid contained in the reaction container 116 in a non-contact manner; the carrying mechanism 125 that carries the reaction container 116 between the reaction container disk 120 and the stirring mechanism 124; the reagent disk 122 that holds the reagent container 121; and the reagent dispensing mechanism 123 that suctions and discharges the reagent contained in the reagent container 121, in which the stirring mechanism 124 is provided at a position where the reagent dispensing mechanism 123 discharges the reagent, and the reagent dispensing mechanism 123 discharges the reagent, which is sucked from the reagent container 121, to the reaction container 116 installed in the stirring mechanism 124.

In the automatic analyzer 1 having the above-described configuration, the stirring mechanism 124 is provided at the position where the reagent dispensing mechanism 123 discharges the reagent. Therefore, the reagent is injected in a state where a flow is formed in the liquid contained in the reaction container 116, and precipitation of insoluble matter caused by deviation from a desired mixing ratio of the mixed solution can be prevented.

The stirring mechanism 124 stirs the liquid in the reaction container 116 in a non-contact manner. Therefore, the sample in the reaction container 116 or the reagent discharged by the reagent dispensing mechanism 123 can be prevented from being taken out to the outside of the reaction container 116.

Accordingly, the automatic analyzer 1 according to the embodiment implements an automatic analysis technique that prevents liquid contained in a reaction container from locally contacting with liquid added afterward with a high concentration and has less occurrence frequency of equipment malfunction and high performance.

The present invention is not limited to the embodiment and includes various modification examples. For example, the embodiments have been described in detail in order to easily describe the present invention, and the present invention is not necessarily to include all the configurations described above. A part of the configuration of one embodiment can be replaced with the configuration of another embodiment. The configuration of one embodiment can be added to the configuration of another embodiment. Addition, deletion, and replacement of another configuration can be made for a part of the configuration each of the embodiments.

DESCRIPTION OF REFERENCE NUMERALS AND SIGNS

101: analysis unit
102: controller
103: input unit
104: display unit
111: sample container
112: carrying mechanism
113: sample dispensing mechanism
114: dispensing chip attaching/detaching unit
115: dispensing chip mounting rack
116: reaction container
117: reaction container mounting rack
118: carrying mechanism
119: opening on reaction container disk
120: reaction container disk
121: measurement reagent container
122: reagent disk
123: reagent dispensing mechanism
124: stirring mechanism
125: carrying mechanism
126: nozzle rotating track
131: detector
132: dispensing mechanism for detector
301: stirring mechanism
302: reaction container
303: nozzle

The invention claimed is:

1. An analysis method comprising:
a step in which a carrying mechanism carries a reaction container containing a sample from a reaction container disk to a stirring mechanism and installs the reaction container in the stirring mechanism;
a step in which the stirring mechanism, including an ultrasonic wave emission apparatus configured to emit ultrasonic waves from a piezoelectric element to a side surface of the reaction container to form a rotational flow of a liquid in the reaction container, starts to stir the sample contained in the reaction container without contacting the sample;
a step in which a reagent dispensing mechanism intermittently discharges a reagent to the reaction container a plurality of times after the stirring mechanism starts the stirring, and the stirring mechanism stirs the liquid contained in the reaction container while the reagent dispensing mechanism stops discharging the reagent to the reaction container;
a step in which the carrying mechanism returns the reaction container, to which the reagent is discharged, from the stirring mechanism to the reaction container disk;
a step in which a detector measures a light emission amount of the reagent; and
a step in which a controller controls analysis of the light emission amount of the reagent;
wherein a stirring speed of the stirring mechanism is controlled by controlling an intensity of ultrasonic waves emitted to the reaction container, and the stirring mechanism stirs the liquid contained in the reaction container such that a relation of $U_N \leq U_{N+1}$ is established, where $U_N$ represents a first stirring speed performed after the reagent dispensing mechanism discharges the reagent N times and $U_{N+1}$ represents a second stirring speed performed after the reagent dispensing mechanism discharges the reagent (N+1) times.

2. The analysis method according to claims 1, wherein the stirring mechanism stirs the liquid contained in the reaction container before the reagent dispensing mechanism completely discharges a predetermined amount of the reagent to the reaction container.

3. The analysis method according to claims 1, wherein the reagent dispensing mechanism changes an amount per unit time of the reagent to be discharged, based on a total amount of the reagent discharged to the reaction container or a period of time elapsed from the start of discharge of the reagent to the reaction container.

4. The analysis method according to claims 1, wherein the reagent dispensing mechanism discharges the reagent such that a relation of $V_A \leq V_B$ is established, where $V_A$ represents an amount per unit time of the liquid to be discharged after $T_A$ seconds from the start of discharge of the reagent to the reaction container, and $V_B$ represents an amount per unit time of the liquid to be discharged after $T_B$ seconds (where $T_A \leq T_B$) from the start of discharge of the reagent to the reaction container.

5. The analysis method according to claim 1, wherein the reagent dispensing mechanism discharges the reagent to the reaction container several times such that a relation of $V_N \leq V_{N+1}$ is established, where $V_N$ represents an amount of the liquid to be discharged at an N-th time and $V_{N+1}$ represents an amount of the liquid to be discharged at an (N+1)-th time.

6. The analysis method according to claim 1, wherein
a stirring speed of the stirring mechanism is controlled by controlling an intensity of ultrasonic waves emitted to the reaction container, and changes to the stirring speed are determined based on a total amount of the reagent discharged to the reaction container by the reagent dispensing mechanism or a period of time elapsed from the start of discharge of the reagent to the reaction container.

7. The analysis method according to claim 1, wherein
the reaction container is installed in the stirring mechanism and the stirring mechanism is temperature-controlled such that the reaction container maintains a temperature within a predetermined range.

* * * * *